US006582802B1

(12) United States Patent
Ohbayashi et al.

(10) Patent No.: US 6,582,802 B1
(45) Date of Patent: Jun. 24, 2003

(54) INK JET RECORDING MEDIUM

(75) Inventors: Keiji Ohbayashi, Hino (JP); Yoshinori Tsubaki, Hino (JP); Kimie Tachibana, Hino (JP)

(73) Assignee: Konica Corporation (JP)

( * ) Notice: Subject to any disclaimer, the term of this patent is extended or adjusted under 35 U.S.C. 154(b) by 40 days.

(21) Appl. No.: 09/713,880

(22) Filed: Nov. 16, 2000

(30) Foreign Application Priority Data

Nov. 18, 1999 (JP) .......................................... 11-328090
Nov. 19, 1999 (JP) .......................................... 11-329635

(51) Int. Cl.[7] .............................. B32B 5/18; C08J 9/28
(52) U.S. Cl. .................... 428/195; 428/478.2; 428/327; 428/323; 428/325; 428/328; 428/331; 428/206
(58) Field of Search ................................ 428/195, 206, 428/478.2, 327, 323, 325, 328, 331

(56) References Cited

U.S. PATENT DOCUMENTS 6,153,305 A * 11/2000 Uemura et al. .......... 428/478.2
6,177,187 B1 * 1/2001 Niemoller et al. .......... 428/327
6,500,525 B1 * 12/2002 Ogino et al. ................ 428/195

FOREIGN PATENT DOCUMENTS

| | | |
|---|---|---|
| EP | 0819547 | 1/1999 |
| EP | 0888904 | 1/1999 |
| EP | 0889080 | 1/1999 |
| WO | WO9720697 | 12/1997 |

OTHER PUBLICATIONS

European Search Report EP 00 31 0187.

* cited by examiner

*Primary Examiner*—Cynthia H. Kelly
*Assistant Examiner*—Kimberly T. Nguyen
(74) *Attorney, Agent, or Firm*—Muserlian, Lucas & Mercanti

(57) ABSTRACT

An ink jet recording medium is disclosed. The recording medium comprises a support and a porous ink absorbing layer comprising inorganic particles and hydrophilic binder which is hardened employing inorganic hardener and organic hardener. The ink jet recording medium exhibits high ink absorbability and desired water resistance without degrading layer brittleness through sufficiently hardening the layer employing an appropriate amount of hardeners.

22 Claims, No Drawings

INK JET RECORDING MEDIUM

FIELD OF THE INVENTION

The present invention relates to an ink jet recording medium (hereinafter referred to as a recording medium, an ink jet recording sheet, or a recording sheet) having a ink absorbing layer, and specifically to an ink jet recording medium in which brittleness and water resistance of a coated layer is improved.

BACKGROUND OF THE INVENTION

In recent years, ink jet recording has resulted in rapid progress of image quality, which is nearly approaching that of the conventional photography. In order to achieve the quality of conventional photography, improvement has been carried out in the aspect of recording sheets. Recording sheets, which are prepared by applying a fine void layer onto a support having high surface smoothness, exhibit excellent ink absorbing and drying properties. Thus said sheet is becoming one of recording sheets which result in image quality approaching conventional photography.

In order to obtain such high quality print images, a high ink absorbing rate is required. When the ink absorbing rate is low, before being absorbed perfectly, ink droplets unite with each other to result in spottiness.

In recent high-speed printing, from the viewpoint of image quality, it is essentially required that an ink absorbing layer comprises a void structure.

Since the ink absorbing layer comprises said void structure, ink droplets are temporarily absorbed into voids. Thus, even immediately after printing, the surface exhibits almost a dried state. However, since ink solvents (for example, water and organic solvents) remain in the void structure, the resultant coated layer not always bears sufficient strength compared to that before printing. As a result, a problem has occurred in which the surface tends to be abraded during handling immediately after printing.

Said problem tends to occur particularly when a non-water absorbing support, which does not absorb ink solvents, is employed.

In order to enhance the coating strength of an ink absorbing layer, heretofore, regarding ink jet recording sheets, hardening a hydrophilic binder using hardeners has been widely carried out in the same manner as those commonly employed.

In the case of recording sheets which comprise a so-called swelling type ink absorbing layer, in which ink is absorbed utilizing swelling properties of a hydrophilic binder, when hardened by the addition of a hardener, it is difficult to carry out sufficient hardening due to a decrease in ink absorbability. Further, in most cases, it was impossible to place a printed sheet on a previously printed one for the time being after printing. On the contrary, it has been discovered that recording sheets comprising a void structure, containing an ink absorbing layer (hereinafter occasionally referred to as a porous ink absorbing layer), has almost no such limitations, but rather, the more hardened, the higher the ink absorbability tends to be.

For this reason, it is considered that in a recording sheet having a void structure comprising an ink absorbing layer, the swellability of a hydrophilic binder forming a void structure is further restricted, and in the upper region (namely the side nearer the surface) of the ink absorbing layer, hindrance of ink penetration due to swelling of the hydrophilic binder is restricted.

Accordingly, in ink jet recording sheets having a void structure comprising an ink absorbing layer, in accordance with an increase of hardening of said ink absorbing layer, it is possible to increase ink absorbability and to enhance water resistance of said layer.

Since in the ink absorbing layer comprising the void structure, ink droplets are temporarily absorbed into said void layer, even immediately after printing, the surface exhibits almost a dried state. However, since ink solvents (for example, water and organic solvents) remain in the void structure, the resultant layer not always bears sufficient strength compared to that before printing. As a result, a problem has occurred in which the surface tends to be abraded during handling immediately after printing.

Heretofore, it has been well known that in ink jet recording sheets, hydrophilic binders are hardened.

For example, U.S. Pat. No. 4,592,951 discloses an ink jet recording sheet comprising polyvinyl alcohol which is hardened employing boric acid based cross linking agents; Japanese Patent Publication Open to Public Inspection No. 10-119423 discloses an ink jet recording sheet comprising fine inorganic particles and boric acid based hardeners or epoxy based hardeners; and Japanese Patent Publication Open to Public Inspection No. 11-115308 discloses a method in which after applying a coating composition comprising fine inorganic particles and a hydrophilic resin, a cross linking agent is supplied before decreasing drying, and described as preferable hardeners are boric acid salts, aldehydes, polyisocyanates, methylolurea, and boric acid salts are listed as specifically preferable hardeners. In addition, Japanese Patent Publication Open to Public Inspection No. 11-198519 describes an ink jet recording sheet employing specific epoxy based hardeners.

However, when hardening is carried out employing conventional methods known in the art, side effects occur. Thus it is hard to describe that sufficient effects have been obtained.

For example, in the case of the use of inorganic hardeners such as boric acid salts, and the like, when the used amount of said hardeners increases to carry out sufficient hardening to achieve the desired layer strength, the resultant layer is more brittle and tends to result in cracking at low humidity.

On the other hand, when hardeners such as epoxy based and aldehyde based or polycyanate based hardeners are employed in an amount to obtain sufficient layer strength, hardening of the hydrophilic binder itself proceeds sufficiently. However, the void ratio of ink jet recording sheets, having a void structure comprising ink absorbing layer decreases and the ink absorbing amount also tends to be decreased. Thus it has been impossible to obtain the high layer strength while maintaining a high ink absorbing amount.

The inventors of the present invention have noticed that as the ink receiving layer having a void structure is hardened, the rate of ink absorption tends to increase. Then it has been assumed that in the upper portion (the side nearer the surface) of the void layer, the hindrance of ink penetration is restricted due to the fact that the swell ability of hydrophilic binders comprising said void structure is further restricted. Namely it has been discovered that as the ink receiving layer having said void structure of an ink jet recording sheet is hardened, the ink absorbability increases and at the same time, the hydrophilicity of the layer is enhanced.

However, when hardening is carried out employing the aforementioned conventional methods known in the art, it has been found that side effects occur, and it is impossible to obtain sufficient physical properties of the resultant layer. For example, it has been found that when hardeners such as borates and the like are employed in an amount which is necessary for obtaining sufficient water resistance, the brittleness of the resultant layer is degraded, and when stored under hard circumstance at a relatively low temperature, cracking tends to occur.

Further, it has been found that when an image receiving layer forming coating composition, comprising epoxy based, aldehyde based, or polyisocyanate based hardeners is coated, due to the instability of these hardeners against water, sufficient hardening is not obtained in an amount which theoretically results in sufficient hardening. However, it has also been found that when the excessive amount of those is employed, ink is not sufficiently absorbed probably due to a decrease in the void ratio of the void layer.

SUMMARY OF THE INVENTION

Accordingly, an object of the present invention is to provide an ink jet recording medium which exhibits high ink absorbability and desired water resistance without degrading layer brittleness through sufficiently hardening the layer employing an appropriate amount of hardeners.

It is another object of the present invention to provide an ink jet recording medium comprising a porous ink absorbing layer which does not degrade the ink absorbing amount and the brittleness of a layer and enhances said layer strength.

The invention and its embodiment are described below.

An ink jet recording medium comprising a support having thereon an ink absorbing layer comprising inorganic particles and a hydrophilic binder which is hardened employing an inorganic hardener and an organic hardener.

The inorganic hardener is acid containing boron atom or salt thereof.

The preferable organic hardener is polyisocyanate based hardener, epoxy based hardener or aldehyde based hardener.

The preferable hydrophilic binder is polyvinyl alcohol.

The preferable inorganic hardener is boric acid, orthoboric acid, diboric acid, meta-boric acid, tetraboric acid or heptaboric acid, or salt thereof.

The preferable organic hardener is polyisocyanate compound.

The preferable ratio of inorganic hardener to organic hardener is from 5:1 to 1:5 by weight.

The ink absorbing layer is preferably porous.

The preferable amount of the inorganic hardener is 4 to about 50 percent and amount of the organic hardener is 5 to 100 percent by weight with respect to hydrophilic binder. 9 4516

The ratio of the inorganic particles to the hydrophilic binder in the ink absorbing layer is preferably between 2:1 and 10:1 by weight.

A method of preparing an ink jet recording medium which comprises coating composition for forming an ink receiving layer comprising fine particles and hydrophilic binder on a support, drying coated composition, and then supplying a hardener to the coated composition.

In this method the hardener is preferably an organic compound. The composition for forming an ink receiving layer preferably contains an inorganic hardener.

An image forming method ejecting water soluble ink onto a recording medium which comprises a support having thereon an ink absorbing layer (preferably, porous) comprising inorganic particles and hydrophilic binder which is hardened employing inorganic hardener and organic hardener.

Hardeners, which harden hydrophilic binders, generally exhibit relatively high reactivity with water. Thus when said hardeners are brought into contact with solvents (water and the like) contained in an ink receiving layer forming coating composition comprising fine particles and hydrophilic binders, they undergo reaction and possibility results in which their capability of hardening said hydrophilic binders decreases. According to the present invention, after drying a water based coating composition, said hardeners are provided. Thus hardening reaction between said hardeners and hydrophilic binders is not hindered, and it is possible to sufficiently carry out said reaction. Accordingly, it is possible to provide the ink jet recording medium which exhibits high ink absorbability and desired water resistance without degrading layer brittleness.

Further, isocyanate based compounds act on hydrophilic binders in the ink receiving layer to strengthen said ink receiving layer. Said isocyanate based compounds exhibit possibility to react with water employed as solvents in the ink receiving layer forming coating composition in the same manner as hardeners of hydrophilic binders. Accordingly, it was considered that when said isocyanate based compounds are provided after coating said ink absorbing layer forming coating composition and subsequently drying the coated layer, the resultant ink absorbing layer may be sufficiently hardened in such a manner that the reaction of said isocyanate based compounds with said hydrophilic binders is not hindered due to the absence of water and the like. As a result, it is possible to provide the ink jet recording medium which exhibits high ink absorbability and desired water resistance without degrading the brittleness of the resultant layer.

Further, the preferable embodiment of the present invention is as follows:

An ink jet recording medium which is obtained via a process providing a polyisocyanate based hardener after applying an image receiving layer forming coating composition comprising fine particles and a hydrophilic binder onto a support and subsequently drying the coated layer. Namely, considered are various reactions of hydrophilic binders with the isocyanate based compounds in the ink absorbing layer. It is considered that of these reactions, one, in which the polyisocyanate based hardener having at least two isocyanate groups hardens the hydrophilic binder, exhibits pronounced effects of the present invention. Accordingly, according to the preferable embodiment described above, the more pronounced effects of the present invention are exhibited, and thus it is possible to provide the ink jet recording medium which exhibits high ink absorbability, and desired water resistance without degrading the brittleness of the resultant layer.

Another preferable embodiment of the present invention is as follows:

An ink jet recording medium which is obtained via a process providing a polyisocyanate based hardener after applying an image receiving layer forming coating composition comprising fine particles, a polyvinyl alcohol based hydrophilic binder, and boric acid or salts thereof onto a support and subsequently drying the coated layer. By employing said embodiment, it is possible to exhibit the most pronounced effects of the present invention.

Further, in the preferable embodiment, said hardeners and isocyanate based compounds are provided after applying said ink absorbing layer forming coating composition onto a support and subsequently drying the coated layer. However, the hardener providing process may be provided after coating said ink absorbing layer forming coating composition onto a support, drying the coated layer, and temporarily winding the dried coating. Alternatively, the resultant coating may be subjected to coating of a hardener solution and the like without winding. There is no particular limitation.

The present invention will now be detailed below.

Employed as supports of the ink jet recording medium of the present invention are non-water absorbing, or water absorbing, supports. When the support is a non-water absorbing type, while applying an ink absorbing layer onto said support, neither organic hardeners nor inorganic hardeners diffuse into said support, and they are capable of effectively hardening polyvinyl alcohol. As a result, the effects of the present invention are markedly pronounced. In addition, the support itself exhibits high water resistance. Thus, a non-water absorbing support is preferably employed. Further, said non-water absorbing supports preferably produces high quality prints.

In addition, said support may be a transparent support or an opaque support.

Listed as transparent supports employed in the present invention are films and the like, which are comprised of materials such as polyester based resins, diacetate based resins, triacetate based resins, acryl based resins, polycarbonate based resins, polyvinyl chloride based resins, polyimide based resins, cellophane, celluloid, and the like. When the ink jet recording medium of the present invention is used for OHP, supports, which are resistant for radiation heat, are preferred and polyethylene terephthalate is particularly preferred. The thickness of such transparent supports is preferably between about 50 and about 200 $\mu$m.

Further, preferred as opaque supports are, for example, resin coated paper (so-called RC paper), having a layer comprised of polyolefin resins, into which white pigments and the like are incorporated, on at least one side of a support and white PET films, prepared by adding white pigments such as barium sulfate and the like into polyethylene terephthalate film.

For the purpose of increasing the adhesion between the aforementioned various types of supports and the ink absorbing layer, prior to the coating of said ink absorbing layer, each said support is preferably subjected to corona discharge treatment, subbing treatment, and the like. Further, the recording sheet of the present invention need not be always colorless, i.e. colored recording sheets may also be employed.

In order to obtain low-cost high-quality images which approach conventional photography, it is specifically preferable to employ a paper support which has a polyethylene laminated on both surfaces. Such a polyethylene laminated paper support will be described below.

Paper employed for said paper support is produced employing wood pulp as a main raw material, and in addition, employing synthetic pulp such as polypropylene, etc. or synthetic fiber such as nylon, polyester, etc., if required. As wood pulp, any of LBKP, LBSP, NBKP, NBSP, LDP, NDP, LUKP, and NUKP may be employed. However, LBKP, NBSP, LBSP, NDP, and LDP having a shorter fiber portion are preferably employed in a larger ratio. However, the content ratio of LBSP and/or LDP is preferably between 10 and 70 percent by weight.

As the above-mentioned pulp, chemical pulp (sulfate salt pulp, sulfite pulp, and the like) containing minimum impurities is preferably employed, and pulp, which has been subjected to bleaching treatment to increase whiteness, is also beneficial.

Optionally added into the paper can be higher fatty acids, sizing agents such as alkylketene dimer, etc.; white pigments such as calcium carbonate, talc, titanium oxide, and the like; paper strengthening agents such as starch, polyacrylamide, polyvinyl alcohol, and the like; fluorescent whitening agents, moisture maintaining agents such as polyethylene glycol, and the like; and dispersing agents, softening agents such as quaternary ammonium, and the like.

It is possible that paper supports are produced by blending said fibrous substances, such as wood pulp, with various types of additives, and then subjecting the resultant mixture to carry our papermaking, employing various types of paper making machines such as a long net paper making machine, a circular net paper making machine, a twin wire paper making machine, and the like. Further, if desired, during the papermaking stage, it is possible to carry out size press treatments employing starch, polyvinyl alcohol, and the like in the paper making machine, various coat treatments, and calender treatment.

The degree of water freeness of pulp employed for papermaking is preferably between 200 and 500 cc according to CSF specification. Further, the sum of weight percent of 24-mesh residue and weight percent of 42-mesh calculated portion regarding the fiber length after beating, specified in JIS-P-8207, is preferably between 30 and 70 percent. Further, the weight percent of 4-mesh residue is preferably 20 percent by weight or less.

The weight of the paper is preferably between 30 and 250 g/m$^2$, and is most preferably between 50 and 200 g/m$^2$. The thickness of the paper is preferably between 40 and 250 $\mu$m.

The paper may be calendered, during or after papermaking process, to result in enhanced smoothness. The density of the paper is generally between 0.7 and 1.2 g/m$^2$ (JIS-P-8118). Further, the rigidity of the paper is preferably between 20 and 200 g under conditions specified in JIS-P-8143.

A surface sizing agent may be applied onto the surface of the paper. As surface sizing agents, the same as those described above which can be incorporated into the paper may be employed.

The pH of the paper, when measured employing the hot water extraction method specified in JIS-P-8113, is preferably between 5 and 9.

As polyethylene which covers both surfaces of the paper, low density polyethylene (LDPE) and/or high density polyethylene (HDPE) is primarily employed. However, other than these, LLDPE, polypropylene, and the like, may also be partially employed.

Specifically, a polyethylene layer on the surface of an ink receiving layer is preferably one in which, as widely carried out in photographic paper, rutile- or anatase-type titanium oxide is incorporated into said polyethylene, and opacity and whiteness are improved. The content of titanium oxide is commonly between 3 and 20 percent by weight with respect to polyethylene, and is preferably between 4 and 13 percent by weight.

Polyethylene coated paper may be employed as a glossy paper. Further, polyethylene coated paper having a matte or silk surface may also be employed, which is prepared by embossing when polyethylene is melt-extrusion-coated onto the surface of the paper.

In said polyethylene coated paper, the moisture content of the paper is particularly preferred to be maintained between 3 and 10 percent by weight.

The ink absorbing layer of the present invention comprises hydrophilic binder and inorganic or organic particles. Inorganic particles is preferably employed.

In the invention "water soluble polymer" includes "polymer soluble in a mixed solvent of water and water-miscible organic solvent such as methanol, isopropyl alcohol, acetone and ethyl acetate", in addition to "polymer soluble in water".

The word water soluble means the polymer has solubility of not less than 1 weight % in the above mentioned solvents at room temperature.

Listed as examples of hydrophilic binders, which are employed in the ink receiving layer of the present invention, are polyvinyl alcohol, gelatin, polyethylene oxide, polyvinyl pyrrolidone, polyacrylic acid, polyacrylamide, polyurethane, dextran, dextrin, carrageenan (λ, ι, and the like), agar, Pullulan, water-soluble polyvinyl butyral, hydroxyethyl cellulose, carboxymethyl cellulose, and the like. These hydrophilic binders may be employed in combination of two or more types. The preferable example of the hydrophilic binder is polyvinyl alcohol.

Polyvinyl alcohol, in addition to common polyvinyl alcohols which are obtained by hydrolyzing polyvinyl acetate, also include modified polyvinyl alcohols such as polyvinyl alcohol of which terminals are subjected to cation modification, anion modified polyvinyl alcohol having an anionic group, and the like.

Polyvinyl alcohols, having an average degree of polymerization of at least 1,000, which are obtained by hydrolyzing polyvinyl acetate, are preferably employed from the viewpoint of the brittleness of the resultant layer, and those having an average degree of polymerization of 1,500 to 5,000 are most preferably employed.

Polyvinyl alcohols having a degree of saponification of 70 to 100 percent are preferred, and those having the same at 80 to 99.5 percent are particularly preferred.

Listed as cation modified polyvinyl alcohols are polyvinyl alcohols which have a primary, a secondary or a tertiary amino group and a quaternary ammonium group in the main or side chain of said polyvinyl alcohols, as described in Japanese Patent Publication Open to Public Inspection No. 61-10483. These are obtained by saponifying a copolymer of an ethylenic unsaturated monomer having a cationic group with vinyl acetate.

Listed as ethylenic unsaturated monomers having a cationic group are, for example, trimethyl-(2-acrylamide-2,2-dimethylethyl)ammonium chloride, trimethyl-(3-acrylamide-3,3-dimethylpropyl)ammonium chloride, N-vinylimidazole, N-vinyl-2-methylimidazole, N-(3-dimethylaminopropyl)methacrylamide, hydroxylethyldimethyl(3-methacrylamide)ammonium chloride, trimethyl-(3-methacrylamidopropyl)ammonium chloride, N-(1,1-dimethyl-3-dimethylaminopropyl) acrylamide, and the like.

The ratio of cation modified group containing monomers in the cation modified polyvinyl alcohol is generally between 0.1 and 10 mole percent with respect to vinyl acetate, and is preferably between 0.2 and 5 mole percent.

Listed as anion modified polyvinyl alcohols are, for example, polyvinyl alcohol having an anionic group described in Japanese Patent Publication Open to Public Inspection No. 1-206088, copolymers of polyvinyl alcohol and vinyl compounds having a water-soluble group described in Japanese Patent Publication Open to Public Inspection Nos. 61-237681 and 63-307979, and modified polyvinyl alcohol having a water-soluble group described in Japanese Patent Publication Open to Public Inspection No. 7-285265.

Further, listed as nonion modified polyvinyl alcohols are, for example, polyvinyl alcohol derivatives prepared by adding a polyalkylene oxide group to a part of the vinyl alcohol, as described in Japanese Patent Publication Open to Public Inspection No. 7-9758, and block polymers of vinyl compounds having a hydrophobic group and vinyl alcohol described in Japanese Patent Publication Open to Public Inspection No. 8-25795.

It is possible to employ two or more types of polyvinyl alcohols which are different in their degree of polymerization, in types of modification and the like.

Further, it is possible to employ hydrophilic polymers together with polyvinyl alcohols. Listed as such hydrophilic polymers are, for example, gelatin, polyvinylpyrrolidone, polyethylene oxide, agar, dextrin, carboxymethyl cellulose, hydroxyethyl cellulose, Pullulan, polyacrylic acid, polyacrylamide, and the like.

When these hydrophilic polymers are employed together with polyvinyl alcohol, the amount of these polymers is preferably as small as possible so that the desirable effects of polyvinyl alcohol are not decreased. The employed amount is preferably in the range of 0 to 50 percent by weight with respect to polyvinyl alcohol, and is most preferably in the range of 0 to 30 percent by weight.

Listed as examples of inorganic hardeners employed in the present invention are acids having boron atoms (boric acid, ortho-boric acid, diboric acid, meta-boric acid, tetraboric acid, heptaboric acid, and the like) and salts thereof, zinc salts (zinc sulfate and the like), copper salts (copper sulfate and the like), zirconium salts (zirconium sulfate and the like), and aluminum salts (aluminum sulfate and the like). Of these, preferable inorganic hardeners are acids having boron atoms and salts thereof, and aluminum salts, and the most preferable hardeners are acids having boron atoms or salts thereof.

Organic hardeners employed in the present invention are those which undergo bridge reaction with the hydroxyl group of the binder, for example, polyvinyl alcohol. Listed as those are, for example, aldehyde based hardeners (formalin, glyoxal, dialdehyde starch, polyacrolein, N-methylolurea, N-methylolmelamine, N-hydroxylmethylphthalimide, and the like), active vinyl based hardeners (bisvinylsulfonylmethylmethane, tetrakisvinylsulfomethylmethane, N,N,N-trisacryloyl-1,3,5-hexahydrotriazine, and the like), epoxy based hardeners, and polyisocyanate based hardeners.

Of these, polyisocyanate based polymers, epoxy based polymers and aldehyde based polymers are preferred, polyisocyanate based hardeners and epoxy based hardeners are more preferred, and polyisocyanate polymers are most preferred.

The epoxy based hardeners are compounds which have at least two glycidyl groups in their molecules, many kinds of which are available on the market under trade names such as Denacol, distributed by Nagase Kasei Kogyo Co., Ltd.

Isocyanate compounds are ones which have at least one isocyanate group in their molecules and exhibit high reactivity with polymers having active hydrogen such as an —OH group, an —$NH_2$ group, a —SH group, a —COOH group, and the like. The isocyanate compounds employed in the present invention are isocyanate based hardeners which preferably have at least two isocyanate groups in their molecules and exhibit high reactivity with polymers having active hydrogen such as an OH group, an —$NH_2$ group a —SH group, —COOH group and the like.

Listed as major polyisocyanate hardeners are, for example, tolylenediisocyanate (for example, Takenate 80 distributed by Takeda Yakuhin Co., and Desmodule T-80, distributed by Nippon Polyurethane Co.), diphenylmethanediisocyanate (for example, Isonate 125M distributed by Kasei Upjhon Co., and Suminate M, distributed by Sumitomo Kagaku Co.), hexamethylenediisocyanate (for example, Duranate 50M distributed by Asahi Kasei Co.), isophoronediisocyanate (for example, IPDI-T1890 distributed by Huels), and modified products and prepolymers thereof (for example, Desmodule E1160 distributed by Sumitomo Bayer Co.), multifunctional aromatic isocyanates (for example, Desmodule L distributed by Sumitomo Bayer Co.), aromatic polyisocyanates (for example, Desmodule VL distributed by Sumitomo Bayer Co.), polyfunctional aliphatic isocyanates (for example, Desmodule HL distributed by Sumitomo Bayer Co.), block type polyisocyanates (for example, Desmodule AP Stable distributed by Sumitomo Bayer Co.), polyisocyanate prepolymers and the like.

These polyisocyanate based hardeners are detailed in, for example, "Kakyozai Handobukku (Handbook of Cross Linking Agents)", pp 594–601, (published by Taisei Co., in October 1981).

The employed amount of said inorganic based hardeners is preferably in the range of about 4 to about 50 percent by weight with respect to hydrophilic binder, and is more preferably in the range of 6 to 40 percent by weight.

Further, the employed amount of said organic based hardeners is preferably in the range of 5 to about 100 percent by weight with respect to hydrophilic binder, and is more preferably in the range of 10 to 70 percent by weight.

The employed amount of said inorganic hardeners and organic hardeners is larger than that of common hardeners. This is due to the fact that the ink absorbing layer is porous. Since molecules of hydrophilic binder, for example, polyvinyl alcohol are located relatively far apart from each other, it is assumed that it is necessary to employ a relatively large amount of hardeners.

The ratio of inorganic hardeners to organic hardeners is approximately in the range of 5:1 to 1:5 in terms of the weight ratio.

Methods of supplying inorganic hardeners and organic hardeners to an ink jet recording medium are not particularly limited. For example, they may be added to an ink absorbing layer forming coating composition so that they are directly supplied to the ink absorbing layer. Further, after coating the ink absorbing layer, said hardeners may be applied onto said ink absorbing layer.

Further, inorganic hardeners and organic hardeners may be supplied in combination, or may be supplied separately. For example, when said hardeners are overcoated, inorganic hardeners are blended with organic hardeners and then may be overcoated, or they may be separately overcoated as individual coating compositions. After adding inorganic hardeners to the ink absorbing layer forming coating composition, the organic hardeners may be overcoated, or the reverse order may be employed.

The most preferable embodiment of the present invention is such that boric acid or salts thereof are incorporated into an ink receiving layer forming coating composition, comprising fine particles and hydrophilic binders, and after coating the resultant composition onto a support, and subsequently drying the coated layer, polyisocyanate based hardeners are applied onto the resultant coating, and subsequently dried to obtain a recording medium. By so doing, it is possible to most markedly exhibit the effects of the present invention.

Hardeners such as boric acid or salts thereof, which are employed herein, when a coating composition, which constitutes the ink receiving layer, is applied, may be incorporated into an ink receiving layer forming coating composition or a coating composition which forms another layer adjacent to the ink receiving layer. Further, it is possible to supply said hardeners to the ink receiving layer in such a manner that an ink receiving layer forming coating composition is applied onto a support onto which a coating composition comprising hardeners has been applied, and further, after applying a hardener-free ink receiving layer forming coating composition onto a support, a hardener containing coating composition is overcoated. From the viewpoint of production efficiency and of minimizing cracks during the formation of the ink receiving layer, it is preferable that hardeners are incorporated into the ink receiving layer forming coating composition or a coating composition which forms another layer adjacent to the ink receiving layer so that said hardeners are supplied at the same time when the ink receiving layer is formed.

In the present invention, said hardeners are provided after coating the ink receiving layer forming coating composition onto a support and subsequently drying the coated layer. "After coating" as described herein means the state in which the solvents (water and the like) in the ink receiving layer forming coating composition are almost evaporated from the coated layer. Namely it means that after applying said ink receiving layer forming coating composition onto a support, the content of solvents in said coated layer proportionally decreases with the elapse of time and the state of falling rate of drying is obtained. Further, it is preferable to coat the hardeners according to the present invention under such a state that the water content of said ink receiving layer is 100 percent or less with respect to the void volume of the porous layer as the ink receiving layer formed by the present invention. The more preferred state is such that said water content is 50 percent or less, and the further more preferred state is such that said water content is 30 percent or less. The void volume as described herein means "total dried layer thickness—coated solid portion thickness".

Said hardeners may be coated employing methods in which hardeners themselves or coating compositions prepared by dissolving hardeners in oleophilic solvents (ethyl acetate, acetone, and the like) and hydrophilic solvents (water, alcohol, and the like) are coated or sprayed, or dipping into said compositions is carried out. However, coating methods are not particularly limited.

Listed as examples of inorganic particles employed in the ink absorbing layer are, for example, white pigments such as precipitated calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, synthetic non-crystalline silica, colloidal silica, alumina, colloidal alumina, false boehmite, aluminum hydroxide, lithopone, zeolite, magnesium hydroxide, and the like.

The primary particles of such inorganic particles may be employed without any modification, and particles, which are subjected to formation of secondary aggregated particle, may also be employed. However, from the viewpoint of obtaining high glossiness and high print image density, it is preferable that inorganic particles are employed which have an average particle diameter (primary particle diameter of the particles which are not subjected to modification, and secondary aggregated particle diameter of particles which are subjected to secondary aggregation) in the ink absorbing layer of 200 nm or less.

The average particle diameter as described herein can be obtained in such a manner that inorganic particles in a diluted fine inorganic particle dispersion or in an ink absorbing layer are photographed employing an electron microscope, and each area of randomly selected 100 particles in the resultant photograph is determined, and while assuming the circle having the same area, the diameter of said circle is obtained.

The average particle diameter of inorganic particles in the aforementioned ink absorbing layer is more preferably 100 nm or less.

The inorganic particles as described in the present invention include both inorganic particles having an anionic property on the surface which do not exhibit fixability with respect to dyes, and those having a cationic property on the surface which exhibit fixability with respect to dyes.

In the present invention, as inorganic particles having an anionic property on their surface, silica or colloidal silica, which is synthesized employing a gas phase method, is preferred, because silica or colloidal silica is less expensive and is comprised of fine particles having a low refractive index which is capable of obtaining high reflection density.

When inorganic particles, having an anionic property on their surface, are employed, it is preferable that cationic polymers, which have a tertiary amino group or a quaternary ammonium salt group which exhibits fixability to dyes, are incorporated into the ink absorbing layer.

Employed as such cationic polymers are polymers known in the art, which include, for example, polyethyleneimine, polyallylamine, dicyandiamidopolyalkylenepolyamine, condensates of dialkylamine with epichlorhydrin, polyvinylamine, polyvinylpyridine, polyvinylimidazole, condensates of diallyldimethylammonium salts, quaternary products of polyacrylic acid esters, and the like. Specifically, however, compounds are preferred which are described in Japanese Patent Publication Open to Public Inspection Nos. 10-193776, 10-217601, 11-20300, and WO99/64248.

The amount of said cationic polymers is commonly between 0.01 and 0.3 per fine inorganic particle in terms of the weight ratio, and is most preferably between 0.05 and 0.2.

Further, listed as inorganic particles having a cationic property on their surface are gas phase method silica which is subjected to cation surface treatment and colloidal silica which is subjected to cation surface treatment. Other than these, it is possible employ alumina, colloidal alumina, false boehmite, and the like.

Said inorganic particles having a cationic property on their surface include those in which the surface charge is converted to be cationic by allowing the surface of inorganic particles to couple with silane coupling agents having a quaternary ammonium base group, as described in Japanese Patent Publication Open to Public Inspection No. 8-34160.

The employed amount of said organic based hardeners varies widely depending on the types of hardeners and the types of hydrophilic binders, is generally between 0.01 and 1.5, and is preferably between 0.05 and 1.0.

The added amount of inorganic particles employed in the ink absorbing layer depends greatly on the required ink absorbing capacity, the void ratio of the void layer, the types of inorganic particles, and the types of hydrophilic binders. However, said amount is generally between 5 and 30 g per $m^2$ of the recording medium, and is preferably between 10 and 25 g.

Further, the ratio of inorganic particles employed in the ink absorbing layer to the hydrophilic binder is generally between 2:1 and 10:1 in terms of the weight ratio, and is most preferably between 3:1 and 8:1.

By increasing the ratio of inorganic particles to the hydrophilic binders to such a high value as described above, it is possible to realize a high void ratio in the ink absorbing layer. The void ratio is preferably between 40 and 80 percent and is most preferably between 50 and 70 percent. The void ratio as described herein is one obtained by the formula described below.

Void ratio=100×(totally dried layer thickness—layer thickness of coated solid portion)/totally dried layer thickness.

When the void ratio is no more than 40 percent, the ink absorbing rate tends to decrease, while when said ratio exceeds 80 percent, the ink absorbing layer tends to result in cracking during its production and during storage.

In addition to those described above, various types of additives may be incorporated into an ink absorbing layer of the ink jet recording medium of the present invention, and other layers which are arranged as required.

Incorporated may be those which include, for example, various types of additives known in the art such as polystyrene, polyacrylic acid esters, polymethacrylic acid esters, polyacrylamides, polyethylene, polypropylene, polyvinyl chloride, polyvinylidene chloride, or copolymers of monomers themselves which constitute those, fine organic latex particles of urea resins, melamine resins, or the like, various types of anionic, cationic, nonionic, or amphoteric surface active agents, fluorine based surface active agents, UV absorbers described in Japanese Patent Publication Open to Public Inspection Nos. 57-74193, 57-87988, and 62-261476, antifading additives described in Japanese Patent Publication Open to Public Inspection Nos. 57-74192, 57-87989, 60-72785, 61-146591, 1-950919, 3-13376, and others, fluorescent whitening agents described in Japanese Patent Publication Open to Public Inspection Nos. 5-9-42993, 59-52689, 62-280069, 61-242871, and 4-219266, and others, pH regulators such as sulfuric acid, phosphoric acid, sodium hydroxide, potassium hydroxide, potassium carbonate, and the like, and antifoaming agents, antiseptics, thickening agents, antistatic agents, matting agents, and the like.

Further, listed as compounds, which may be added to minimize bleeding, and the like, are water-soluble polyvalent metal ions. Listed as examples are divalent, trivalent, and tetravalent metal ions. Specifically preferred are $Ca^{2+}$, $Mg^{2+}$, $Zn^{2+}$, and $Al^{3+}$.

When such polyvalent metal ions are employed, the amount is preferably between about 0.1 and about 10 millimoles per $m^2$ of the recording sheet. When the amount is 0.1 millimole or more, bleeding is effectively minimized, while when the amount is 10 millimoles or less, it is possible to minimize other problems such as the aggregation of dyes and the like. The amount is most preferably between 0.2 and 2 millimoles.

A porous ink receiving layer may be comprised at least two layers. In such a case, the configuration of each ink absorbing layer may be different or the same.

From the viewpoint of forming stronger layers without decreasing glossiness, it is preferable that the pH of the opposite surface of the ink absorbing surface of the present invention is preferably between 3.5 and 7.

The pH of the layer surface as described herein is a value determined in such a manner that when 20 to 50 $\mu$L of pure water is dripped on the surface of the ink absorbing layer of the recording medium, employing a micro syringe, and the like, then the surface pH is measured at room temperature, employing a surface pH meter which is available on the market.

Various types of hydrophilic layers of the recording medium of the present invention, such as an ink absorbing layer, a sublayer which are suitably provided if desired, may be applied onto a support employing a method suitably selected from coating methods known in the art. A preferred method is any such that coating compositions constituting each layer are applied onto a support and subsequently dried. Simultaneous coating is particularly preferred in which all coating is completed by simultaneously applying all hydrophilic binder layers onto the support.

Preferably employed as coating methods are: a roll coating method, a rod bar coating method, an air knife coating method, a spray coating method, a curtain coating method, or an extrusion coating method in which a hopper is employed, as described in U.S. Pat. No. 2,681,294.

When images are recorded onto the ink jet recording medium of the present invention, water based ink is preferably employed.

The water based ink as described herein is a recording liquid comprised of colorants described below, liquid media, and other additives. Employed as colorants are direct dyes, acidic dyes, basic dyes, and reactive dyes known in ink jet printing, or water-soluble dyes such as food dyes and the like, or water-dispersible pigments.

Listed as solvents of water based ink are water and various types of water-soluble organic solvents, such as, for example, alcohols such as methyl alcohol, isopropyl alcohol, n-butyl alcohol, tert-butyl alcohol, isobutyl alcohol, and the like; amides such as dimethylformamide, dimethylacetamide, and the like; ketones and ketone alcohols such as acetone; diacetone alcohol, and the like; ethers such as tetrahydrofuran, dioxane, and the like; polyalkylene glycols such as polyethylene glycol, propylene glycol, and the like: polyhydric alcohols such as ethylene glycol, propylene glycol, butylene glycol, triethylene glycol, 1,2,6-hexanrtriol, thiodiglycol, hexylene glycol, diethylene glycol, glycerin, triethanolamine, and the like; lower alkyl ethers of polyhydric alcohols such as ethylene glycol methyl ether, diethylene glycol methyl (or ethyl) ether, triethylene glycol monobutyl ether, and the like; urea and the like.

Of many these water-soluble solvents, preferred are polyhydric alcohols such as diethylene glycol, triethanolamine, glycerin and the like, and lower alkyl ethers of polyhydric alcohol of triethylene glycol monobutyl ether, and the like.

Added to said water based ink may be, for example, pH regulators, metal sequestering agents, antiseptics, viscosity regulators, surface tension regulators, humectants, surface active agents, antirusting agents, and the like.

EXAMPLES

The present invention will now be described below with reference to examples. However, the present invention is not limited to these examples. Incidentally, "%" in the examples means absolute dry percent by weight, unless-otherwise specified.

Example 1

"Preparation Silica Dispersion 1"

Added to 520 liters of pure water, of which pH had been adjusted to 3.0 by adding nitric acid, were 150 kg of gas phase method silica comprised of primary particles having an average particle diameter of 0.012 μm (manufactured by Nihon Aerosil Kogyo Co., Ltd.), and the resultant mixture was subjected to suction dispersion at room temperature, employing a jet stream inductor mixer TDS, manufactured by Mitamura Riken Kogyo Co., Ltd. Thereafter, the total volume was adjusted to 630 liters by adding pure water.

"Preparation of Silica Dispersion 2"

While stirring, added to 18 liters of an aqueous solution (having a pH of 3.0) containing 1.24 kg of cation polymer P-1 described below, 2.2 liters of ethanol, and 1.5 liters of n-propanol were 63.0 liters of Silica Dispersion 1, and subsequently, 1 g of antifoaming agent SN381 (manufactured by San Nopuco Co., Ltd.) was added.

The resultant mixture was subjected to dispersion employing a high pressure homogenizer, manufactured by Sanwa Kogyo Co., Ltd., and the total volume was adjusted to 90 liters by adding pure water to prepare Silica Dispersion 2.

The resultant dispersion was diluted, then applied onto a transparent support, and observed employing an electron microscope. Then, it was found that the average particle diameter was approximately 70 nm (secondary particles).

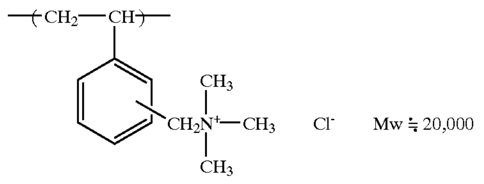

"Preparation of Coating Composition"

Subsequently, the coating composition described below was prepared employing Silica Dispersion 2 prepared as described above.

While stirring, at 40° C., successively added to 600 ml of Silica Dispersion 2 were additives described below.

10% aqueous solution of polyvinyl alcohol (PVA203, manufactured by Kuraray Kogyo Co., Ltd.): 10 ml.

7% aqueous solution of polyvinyl alcohol (PVA235, manufactured by Kuraray Kogyo Co., Ltd.): 360 ml.

"Preparation of Recording Sheet"

Said coating composition was applied onto a polyethylene coated paper prepared by laminating a base paper having a weight of 170 g/m$^2$ with polyethylene on both sides (in which the polyethylene on the ink receiving layer side comprised anatase type titanium dioxide in an amount of 8 percent by weight; the gelatin sublayer of 0.05 g/m$^2$ was applied to the surface of the ink receiving layer side, while on the opposite side, the backing layer was applied which comprised 0.2 g/m$^2$ of a latex polymer having a Tg of about 80° C.) to obtain a wet layer thickness of 160 μm, and temporarily cooled at about 7° C. Thereafter, the resultant coating was dried under a flow of air at 20° C. for 30 seconds, at 50° C. for 30 seconds, at 70° C. for one minute, and at 40° C. for 30 seconds. Thus Ink Jet Recording Sheet 1 was prepared.

The resultant recording sheet comprised 16.0 g of silica, and 4.2 g of polyvinyl alcohol (PVA) per m$^2$.

Next, each of various cross linking agents shown in Table 1 was overcoated onto the resultant Recording Sheet 1, and then stored at 40° C. and 50 percent relative humidity for 24 hours to prepare Recording Sheets 2 through 14.

Incidentally, inorganic hardeners were incorporated in an amount of 0.6 g per m$^2$ of the recording sheet, while organic hardeners were incorporated in an amount of 0.8 g.

Obtained recording sheets were subjected to evaluation of the ink absorbability, the layer brittleness, and the layer strength, employing the methods described below. Table 1 shows the obtained results.

(1) Ink Absorbability

Solid green image printing was carried out employing an ink jet printer PM3000, manufactured by Seiko-Epson Co.

and then the formation of spottiness of the image area was visually evaluated based on the evaluation criteria described below. As the rate of ink absorption decreased, the generation of spottiness increased.

(Evaluation Criteria)

A: no spottiness was observed

B: slight spottiness was observed which was in the range of commercial viability C: spottiness was observed which was beyond the range of commercial viability (2) Layer Brittleness The moisture content of recording sheets was controlled by storing said sheets at 23° C. and relative humidity 20 percent for 24 hours, and subsequently each sheet was wound on a stainless steel cylindrical rod having a diameter of 10 mm, 15 mm, 20 mm, 25 mm, 30 mm, 35 mm, and 40 mm. Then the diameter of the rod, at which the ink absorbing layer cracked, was determined. The layer brittleness was represented by the diameter of the rod on which the ink absorbing layer cracked.

Incidentally, when said value was below 35 mm, the sheet was judged to be commercially viable.

(3) Layer Strength

Immediately after a black solid image was printed employing the ink jet printer employed during the evaluation of the ink absorbability, load, which was continuously increased from 0 g to 100 g, was applied to the resultant print, employing a needle having a spherical tip having a diameter of 1 mm, and the load which resulted in scratch was determined. The resultant load was denoted as the layer strength.

TABLE 1

| Recording Sheet | Inorganic Hardener | Organic Hardener | Ink Absorb-ability | Layer Brittle-ness | Layer Strength (in g) |
|---|---|---|---|---|---|
| 1 (Comparative Example) | none | none | B | 20 | 20 |
| 2 (Comparative Example) | HI-1 | none | A | 30 | 30 |
| 3 (Comparative Example) | HI-2 | none | A | 35 | 35 |
| 4 (Comparative Example) | none | HO-1 | C | 15 | 50 |
| 5 (Comparative Example) | none | HO-2 | C | 10 | 60 |
| 6 (Comparative Example) | none | HO-3 | C | 15 | 55 |
| 7 (Present Invention) | HI-1 | HO-1 | A | 15 | 85 |
| 8 (Present Invention) | HI-1 | HO-2 | A | 10 | 70 |
| 9 (Present Invention) | HI-1 | HO-3 | A | 15 | 55 |
| 10 (Present Invention) | HI-2 | HO-1 | A | 20 | 70 |
| 11 (Present Invention) | HI-2 | HO-2 | A | 20 | 55 |
| 12 (Present Invention) | HI-2 | HO-3 | A | 20 | 50 |
| 13 (Present Invention) | HI-1 | HO-4 | A | 20 | 45 |
| 14 (Present Invention) | HI-1 | HO-5 | A | 25 | 40 |

HI-1: boric acid/borax (5/5 weight ratio mixture)
HI-2: aluminum sulfate
HO-1: Sumidule N3300 (polyisocyanate based hardener, manufactured by Sumitomo Bayer Urethane)
HO-2: glyoxal
HO-3: Denacol EX421 (epoxy based hardener), manufactured by Nagase Kasei
HO-4: tetrakisvinylsulfonylmethylmethane (active vinyl based hardener)
HO-5: N,N,N-triacryloyl-hexahydrotriazine (active vinyl based hardener)

Based on the results shown in Table 1, it is found that Recording Sheets 2 and 3, which comprise only inorganic hardeners, result in slight improvement of the ink absorbability and the layer strength, while they result in degradation of the brittleness compared to the recording sheets comprising hardeners.

Further it is also found that Recording Sheets 4 through 6, which comprise only organic hardeners, result in pronounced improvement of the layer strength and the brittleness, while they result in decrease in the ink absorbability.

On the contrary, Recording Sheets 7 through 14, which comprise both inorganic hardeners and organic hardeners, result in improvement of all ink absorbability, brittleness, and layer strength.

Specifically, when polyisocyanate based hardeners are employed as the organic hardeners (Recording Sheets 7 and 10), the best results are obtained, and Recording Sheets 8 through 12, in which epoxy based hardeners and the aldehyde based hardeners, are employed, exhibit better effects than Recording Sheets 13 and 14 in which active vinyl based hardeners are employed.

Recording sheets, in which boric acid based hardeners are employed as the inorganic hardeners, exhibit the best results.

Example 2

Recording Sheets 21 through 29 were prepared in the same manner as Recording Sheet 7, except that the amount of inorganic hardeners and the organic hardeners employed for the preparation of Recording Sheet 7 of Example 1 were varied as shown in Table 2.

Obtained Recording Sheets 21 through 29 were evaluated in the same manner as Example 1. Table 2 shows the obtained results. Incidentally, in Table 2, the results of Recording Sheet 7 were shown to the reference.

TABLE 2

| Recording Sheet | Inorganic Hardener | Organic Hardener | Ink Absorb-ability | Layer Brittle-ness | Layer Strength (in g) |
|---|---|---|---|---|---|
| 7 (Present Invention) | 0.6 g (14%) | 0.8 g (19%) | A | 15 | 85 |
| 21 (Present | 0.1 g (2%) | 0.8 g (19%) | B | 10 | 50 |

TABLE 2-continued

| Recording Sheet | Inorganic Hardener | Organic Hardener | Ink Absorb-ability | Layer Brittle-ness | Layer Strength (in g) |
|---|---|---|---|---|---|
| Invention) | | | | | |
| 22 (Present Invention) | 0.3 g (7%) | 0.8 g (19%) | A | 15 | 65 |
| 23 (Present Invention) | 0.8 g (19%) | 0.8 g (19%) | A | 20 | 80 |
| 24 (Present Invention) | 1.2 g (29%) | 0.8 g (19%) | A | 25 | 65 |
| 25 (Present Invention) | 2.2 g (52%) | 0.8 g (19%) | A | 30 | 50 |
| 26 (Present Invention) | 0.6 g (14%) | 0.1 g (2%) | A | 30 | 40 |
| 27 (Present Invention) | 0.6 g (14%) | 0.4 g (10%) | A | 20 | 75 |
| 28 (Present Invention) | 0.6 g (14%) | 1.6 g (38%) | A | 15 | >100 |
| 29 (Present Invention) | 0.6 g (14%) | 3.0 g (71%) | B | 10 | >100 |

Based on the results shown in Table 2, it is found that Recording Sheets 7 and 22 through 24, in which inorganic hardeners are employed in an amount of 6 to 40 percent with respect to polyvinyl alcohol, are specifically preferable.

On the other hand, Recording Sheets 7, 27, and 28, in which organic hardeners are employed on an amount of 10 to 70 percent with respect to polyvinyl alcohol, are most preferable.

Example 3

Recording Sheets 31 through 36 were prepared in the same manner as Recording Sheet 7, except that the types of organic hardeners employed for the preparation of Recording Sheet 7 of Example 1 were varied as shown in Table 3. Further, the added amount of organic hardeners was the same as Recording Sheet 7.

Obtained Recording Sheets 31 through 36 were evaluated in the same manner as Example 1. Table 3 shows the obtained results.

TABLE 3

| Recording Sheet | Organic Hardener | Ink Absorb-ability | Layer Brittle-ness | Layer Strength (in g) |
|---|---|---|---|---|
| 31 (Present Invention) | HC-6 | B | 15 | 80 |
| 32 (Present Invention) | HO-7 | A | 15 | 80 |
| 33 (Present Invention) | HO-8 | A | 10 | 75 |
| 34 (Present Invention) | HO-9 | A | 15 | 85 |
| 35 (Present Invention) | HO-10 | A | 20 | 50 |
| 36 (Present Invention) | HO-11 | A | 15 | 55 |

HO-6: Sumidule IL (isocyanate based), manufactured by Sumitomo Bayer Urethane
HO-7: Takenate D204EA (isocyanate based), manufactured by Takeda Yakuhin Co.
HO-8: Coronate HX (isocyanate based), Nihon Polyurethane Co.
HO-9: Aquanate 100 (isocyanate based), manufactured by Nihon Polyurethane Co.
HO-10: Denacol EX-811 (epoxy based), manufactured by Nagase Kasei Co.
HO-11: Denacol EX-150 (epoxy based), manufactured by Nagase Kasei Co.

Based on the results shown in Table 3, it is found that all Recording Sheets 31 through 34, in which polyisocyanate based hardeners are employed, exhibit the same properties as Recording Sheet 7 and the layer brittleness and the layer strength is improved without a decrease in the ink absorbability.

Further, it is found that Recording Sheets 35 and 36, when polyisocyanate based hardeners are employed, exhibit insufficient effects, but they are more improved than Comparative Example 1 in terms of the layer brittleness and the layer strength due to effects of hardeners employed in combination.

Example 4

“Preparation Silica Dispersion 3”

Added to 620 liters of pure water, of which pH had been adjusted to 2.7 by adding nitric acid, were 125 kg of gas phase method silica comprised of primary particles having an average particle diameter of 0.007 $\mu$m (Aerosil 300, manufactured by Nihon Aerosil Kogyo Co., Ltd.), and the resultant mixture was subjected to suction dispersion at room temperature, employing a jet stream inductor mixer TDS, manufactured by Mitamura Riken Kogyo Co., Ltd. Thereafter, the total volume was adjusted to 694 liters by adding pure water.

“Preparation of Silica Dispersion 4”

While stirring, added to 18 liters of an aqueous solution (having a pH of 3.0) containing 1.63 kg of cation polymer P-1 described below, 2.0 liters of ethanol, and 1.5 liters of n-propanol were 69.4 liters of Silica Dispersion 3, and subsequently, 7.0 l of aqueous solution containing 260 g of boric acid and 230 g of borax was added then 1 g of antifoaming agent SN381 (manufactured by San Nopuco Co., Ltd.) was added.

The resultant mixture was subjected to dispersion employing a high pressure homogenizer, manufactured by Sanwa Kogyo Co., Ltd., and the total volume was adjusted to 97 liters by adding pure water to prepare Silica Dispersion 4.

The resultant dispersion was diluted, then applied onto a transparent support, and observed employing an electron microscope. Then, it was found that the average particle diameter was approximately 50 nm (secondary particles).

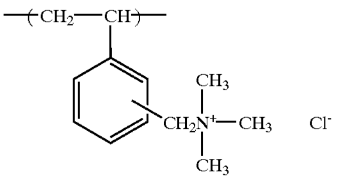

Mw ≒ 20,000

"Preparation of Coating Composition"

Subsequently, the coating composition described below was prepared employing Silica Dispersion 4 prepared as described above.

While stirring, at 40° C., successively added to 650 ml of Silica Dispersion 4 were additives described below.

(1) 10% aqueous solution of polyvinyl alcohol (PVA203, manufactured by Kuraray Kogyo Co., Ltd.): 6 ml (2) 5% aqueous solution of polyvinyl alcohol (PVA235, manufactured by Kuraray Kogyo Co., Ltd.): 300 ml The total volume was adjusted to 1,000 ml by adding pure water.

"Preparation of Recording Sheet"

Said coating composition was applied onto a polyethylene coated paper prepared by laminating a base paper having a weight of 180 g/$m^2$ with polyethylene on both sides (in which the polyethylene on the ink receiving layer side comprised anatase type titanium dioxide in an amount of 8 percent by weight; the gelatin sublayer of 0.05 g/$m^2$ was applied to the surface of the ink receiving layer side, while on the opposite side, the backing layer was applied which comprised 0.2 g/$m^2$ of a latex polymer having a Tg of about 80° C.) to obtain a wet layer thickness of 170 μm, and temporarily cooled at about 7° C. Thereafter, the resultant coating was dried under a flow of air at 20° C. to 65° C., so that water content in the ink receiving layer becomes lower than 30% of the void content. Thus Ink Jet Recording Sheet A was prepared.

Next, each of various hardening agents shown in Table 4 was overcoated onto the resultant Recording Sheet A, they were dried at 80° C. for 20 seconds and then stored at 40° C. and 30 percent relative humidity for 24 hours to prepare Recording Sheets 101 through 108.

Further, Recording Sheet A was prepared employing a method in which a coating composition was applied onto a support to obtain a wet thickness of 170 μm, temporarily cooled at about 7° C., and thereafter, the resultant coating was blown with air at 20 to 50° C., at the time when the water content of the ink absorbing layer was 200 percent with respect to the void volume, each of hardeners shown in Table 4 was overcoated, and subsequently dried at 80° C. for 4 minutes and then each resultant coating was stored at 40° C. and relative humidity 30 percent for 24 hours to prepare Recording Sheets 132, 133, and 138. Incidentally, overcoating was carried out to obtain a coated amount of hardeners of 1.0 g/$m^2$ Table 4 also shows the results.

Further, each of hardeners instead of boric acid and borax was incorporated into Silica Dispersion 4 so as to obtain a coated amount of said hardener as shown in Table 4, and thus Silica Dispersions 5*a*, 5*b*, and 5*g* were prepared. Recording Sheets 105*a*, 105*b*, and 105*g* were then prepared in the same manner as Recording Sheet A, except that coating compositions were prepared while replacing Silica Dispersion 4 with Silica Dispersion 5*a*, 5*b*, and 5*g*.

Obtained recording sheets were subjected to evaluation of the ink absorbability, the layer brittleness, and the layer strength, employing the methods described below. Table 4 shows the obtained results.

Ink Absorbability

Solid green image printing was carried out employing an ink jet printer PM3000, manufactured by Seiko-Epson Co. and then the formation of spottiness of the image area was visually evaluated based on the evaluation criteria described below. As the rate of ink absorption decreased, the generation of spottiness increased.

(Evaluation Criteria)

A: no spottiness was observed

B: slight spottiness was observed which was in the range of commercial viability C: spottiness was observed which was beyond the range of commercial viability Layer Brittleness The moisture content of recording sheets was controlled by storing said sheets at relative humidity 17 percent for 24 hours, and subsequently each sheet was wound on a stainless steel cylindrical rod having a diameter of 10 mm, 15 mm, 20 mm, 25 mm, 30 mm, 35 mm, and 40 mm. Then the diameter of the rod, at which the ink absorbing layer cracked, was determined. The layer brittleness was represented by the diameter of the rod on which the ink absorbing layer cracked.

The sheet was judged to be commercially viable when said value was below 35 mm.

Water Resistance

The recording paper was immersed in purified water for one minute, and then was subject to air-drying. Obtained samples were evaluated by observing change of surface glossiness and roughness. The criteria are;

A: change is observed.

B: Slight change is observed.

Big change in cockle or glossiness is observed.

The result is shown in Table 4.

TABLE 4

| Recording Sheet | Hardener* | Ink Absorb-ability | Water Resistance (glossiness) | Brittle-ness |
|---|---|---|---|---|
| 101 | none | B | C | 35 |
| 102 | a | A | A | 25 |
| 103 | b | A | A | 20 |
| 104 | c | A | A | 20 |
| 105 | d | A | A | 25 |
| 106 | e | A | B | 30 |
| 107 | f | A | B | 30 |
| 108 | g | B | B | 30 |
| 132 | a | B | B | 35 |
| 133 | b | B | C | 25 |
| 138 | g | B | B | 40 |
| 105a | a | B | C | 40 |
| 105b | b | B | C | 35 |
| 105c | g | B | C | 45 |

*The hardener is applied to the samples after coating and drying the ink receiving layer.

The water resistance (wrinkling) was graded to be A. Symbols mean the following:

a: ethyl acetate solution of Takenate WD-720, manufactured by Takeda Seiyaku Co.

b: ethyl acetate solution of Sumidule N3300, manufactured by Sumitomo Bayer Urethane c: ethyl acetate solution of Coronate HL, manufactured by Nihon Urethane Kogyo d: ethyl acetate solution of Aquanate 110, manufactured by Nihon Urethane Kogyo e: methanol solution of glyoxal f: methanol solution of methylolmelamine g: methanol solution of diglycidyl ethyl ether As can be seen from Table 4, sheets of the present invention, which were prepared in such a manner that boric acid and borax were incorporated into ink receiving layer forming coating compositions and after coating the ink receiving layer and subsequently drying the coated layer, hardeners were overcoated, exhibited better absorbability, and water resistance, and less brittleness than those in which hardeners were not overcoated, after coating the ink receiving layer forming coating composition, hardeners were overcoated prior to drying the coated layer, and hardeners were incorporated only into the image receiving layer forming coating composition. Specifically, embodiments, in which after coating the ink receiving layer forming coating composition and subsequently drying the coated layer, polyisocyanate based compounds were overcoated, exhibited much better ink absorbability, water resistance (glossiness), and brittleness.

Example 5

Recording Sheet B was prepared employing the same method for preparing Recording Sheet A, except that Silica Dispersion 4 was replaced with Silica Dispersion 6 (said Silica Dispersion 6 was prepared in the same manner as Silica Dispersion 4, except that boric acid and borax were not added when preparing Silica Dispersion 4). Subsequently, each of hardeners shown in Table 5 was overcoated onto resultant Recording Sheet B, and dried at 80° C. for 2 minutes. Thereafter, dried sheets were stored at 40° C. and 30 percent relative humidity for 24 hours. Thus Recording Sheets 111 through 115 were prepared. Evaluation was carried out in the same manner as Example 4. Table 5 shows the results.

TABLE 5

| Sheet | Hardener* | Water Resistance (glossiness) |
|---|---|---|
| 101 | not added | C |
| 111 | not added | B |
| 112 | a | A |
| 113 | b | A |
| 114 | c | A |
| 115 | d | A |

*The hardener is applied to the samples after coating and drying the ink receiving layer.

Overcoating was carried out so that the coated amount of hardeners was 1.0 g/m$^2$.

The water resistance (wrinkling) of all sheets was evaluated A.

Further, when boric acid and borax is not incorporated into the ink absorbing layer forming coating composition, sheets exhibit better brittleness, while both ink absorbability and water resistance are good. Further, it is found that even though boric acid and borax is incorporated into the ink absorbing layer forming coating composition, no problem occurs for practical use, and the water resistance is excellent.

Example 6

Each of various hardeners shown in Table 6 was overcoated onto Recording sheet A prepared in Example 4, subsequently dried at 85° C. for 2 minutes, and then stored at 40° C. and 30 percent relative humidity for 24 hours. Thus Recording Sheets 121, 122, and 25 through 28 were prepared. Evaluation was carried out in the same manner. Table 6 shows the evaluation results.

TABLE 6

| Sheet | Hardener | Ink Absorbability | Water Resistance (glossiness) | Brittleness |
|---|---|---|---|---|
| 101 | not added | B | C | 35 |
| 122 | A | A | B | 25 |
| 125 | D | A | B | 25 |
| 126 | E | A | B | 30 |
| 127 | F | A | B | 30 |
| 128 | G | B | B | 30 |

The water resistance (wrinkling) of all sheets was evaluated A.

Further, hardeners A, and D through G described below were coated to obtain a coated amount of 1.0 g/m$^2$.

A: aqeous dispersion of Takenate WD-720, manufactured by Takeda Yakuhin Co.

D: aqueous solution of Aquanate 110, manufactured by Nihon Polyurethane Kogyo

E: aqueous glyoxal solution

F: aqeous methylolmelamine solution

G: aqeous diglycidyl ethyl ether solution

As can be seen from Table 6, hardeners, which were coated in the form of an aqueous dispersion or aqueous solution, the resultant layers exhibited good ink absorbability and water resistance, and less brittleness.

Example 7

Recording Sheet C was prepared employing the same method for preparing Recording Sheet A, except that the polyethylene coated paper employed as the support in the preparation of said Recording sheet A was replaced with a 160 $\mu$m thick water absorbing cast coated paper. Subsequently, each recording sheet was prepared by overcoating hardeners onto the resultant Recording Sheet C in the same manner as the preparation of Recording Sheets 102 to 108.

The same evaluation was carried out and it was found that though a problem to be solved was left regarding the insufficient water resistance caused by the water absorbing support, effects were noticed in the improvement of ink absorbability and the water resistance of the ink absorbing layer, which were the object of the present invention.

According to the present invention, it is possible to enhance the porous layer strength of an ink jet recording medium without degrading the ink absorbing capacity and the layer brittleness.

Further it is possible to provide an ink jet recording medium which is provided with desired water resistance without degrading the layer strength and exhibits high ink absorbability.

What is claimed is:

1. An ink jet recording medium comprising a support having thereon at least one porous ink absorbing layer comprising inorganic particles and a hydrophilic binder which is hardened by employing an inorganic hardener and an organic hardener, wherein the weight ratio of the inorganic particles to the hydrophilic binder is 3:1 to 10:1.

2. The ink jet recording medium of claim 1 wherein the inorganic hardener is acid containing boron atom or salt thereof.

3. The ink jet recording medium of claim 1 wherein the organic hardener is polyisocyanate based hardener, epoxy based hardener or aldehyde based hardener.

4. The ink jet recording medium of claim 1 wherein the hydrophilic binder is polyvinyl alcohol.

5. The ink jet recording medium of claim 1 wherein the inorganic hardener is boric acid, ortho-boric acid, diboric acid, meta-boric acid, tetraboric acid or heptaboric acid, or salt thereof.

6. The ink jet recording medium of claim 1 wherein the organic hardener is polyisocyanate compound.

7. The ink jet recording medium of claim 6 wherein the polyisocyanate compound comprises at least two isocyanate groups.

8. The ink jet recording medium of claim 1 wherein amount of the inorganic hardener is 4 to 50 percent by weight with respect to hydrophilic binder.

9. The ink jet recording medium of claim 1 wherein amount of the organic hardener is 5 to 100 percent by weight with respect to hydrophilic binder.

10. The ink jet recording medium of claim 1, wherein the ratio of the organic hardener to the inorganic hardener is from 5:1 to 1:5 by weight.

11. The ink jet recording medium of claim 1 comprising at least two porous ink absorbing layers.

12. The ink jet recording medium of claim 4 wherein the inorganic hardener is acid containing boron atom or salt thereof.

13. The ink jet recording medium of claim 12 wherein the organic hardener is polyisocyanate compound.

14. The ink jet recording medium of claim 12 wherein ratio of inorganic hardener to organic hardener is from 5:1 to 1:5 by weight.

15. The ink jet recording medium of claim 14 wherein amount of the inorganic hardener is 4 to 50 percent and amount of the organic hardener is 5 to 100 percent by weight with respect to hydrophilic binder.

16. The ink jet recording medium of claim 15 wherein ratio of the inorganic particles to the hydrophilic binder in the layer is between 2:1 and 10:1 by weight.

17. A method of preparing an ink jet recording medium, comprising the steps of:

coating onto a support a composition for forming an ink receiving layer, wherein the composition comprises inorganic particles and a hydrophilic binder;

drying the coated composition; and then supplying a hardener to the coated composition.

18. A method of claim 17 wherein the hardener is an organic compound and the composition for forming an ink receiving layer contains an inorganic hardener.

19. The method of claim 18 wherein the organic hardener is polyisocyanate based hardener.

20. An image forming method, comprising ejecting water soluble ink onto a recording medium which comprises a support having thereon a porous ink absorbing layer comprising inorganic particles and a hydrophilic binder which is hardened employing an inorganic hardener and an organic hardener.

21. The ink jet recording medium of claim 1, wherein the inorganic hardener is an acid containing a boron atom or salt thereof, and the organic hardener is a polyisocyanate based hardener, epoxy based hardener or aldehyde based hardener.

22. The ink jet recording medium of claim 1, wherein the inorganic particles have an average particle diameter of at most 200 nm.

* * * * *